Feb. 17. 1925.
D. E. WILLIAMSON
HOP PICKER
Filed Oct. 3, 1923
1,526,945
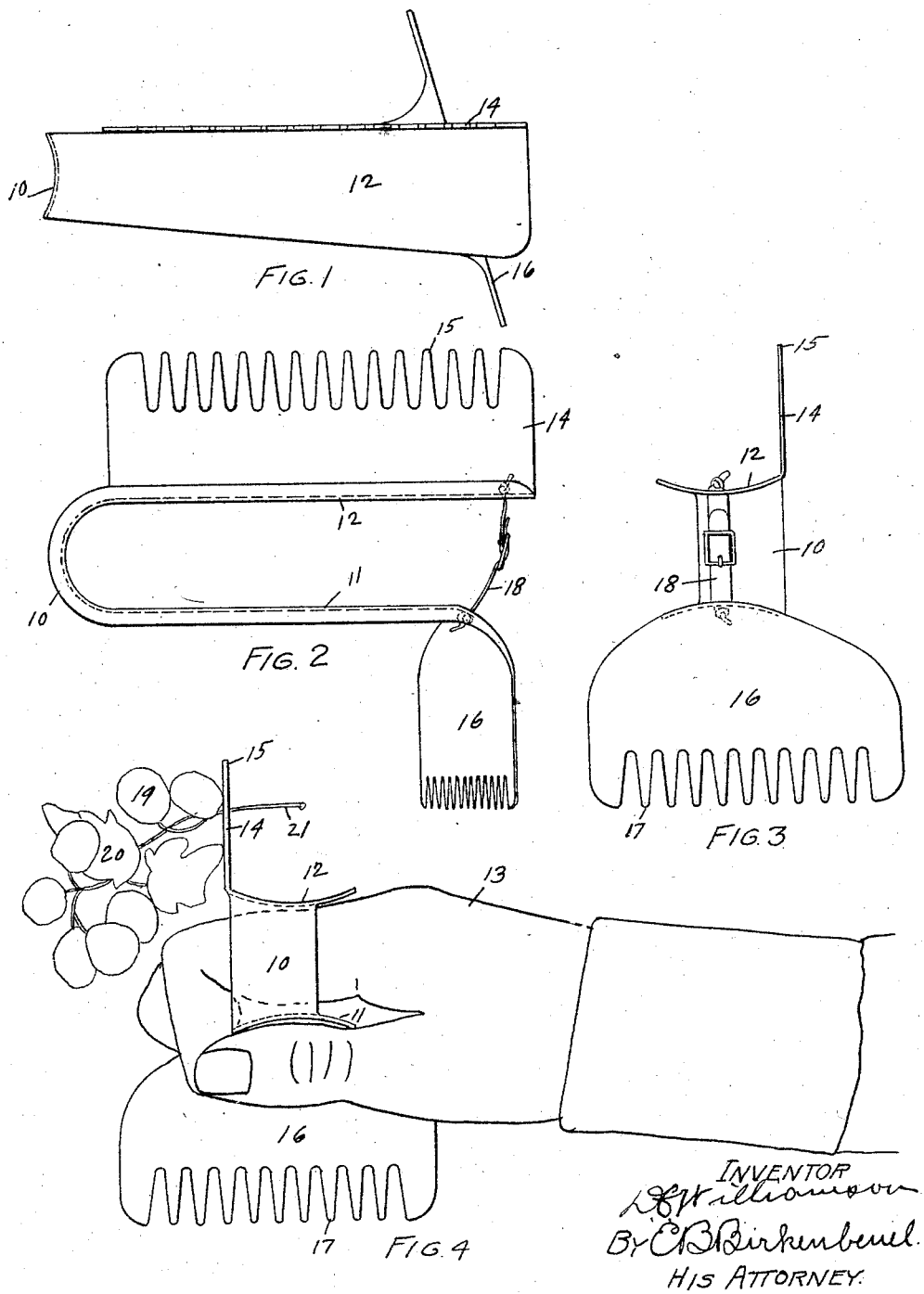

Patented Feb. 17, 1925.

1,526,945

UNITED STATES PATENT OFFICE.

DANIEL E. WILLIAMSON, OF OREGON CITY, OREGON, ASSIGNOR OF ONE-HALF TO BENJAMIN J. GLADHART, OF PORTLAND, OREGON.

HOP PICKER.

Application filed October 3, 1923. Serial No. 666,314.

*To all whom it may concern:*

Be it known that I, DANIEL E. WILLIAMSON, a citizen of the United States, and a resident of Oregon City, in the county of Clackamas and State of Oregon, have invented a new and useful Hop Picker, of which the following is a specification.

This invention relates more particularly to devices for picking hops.

An object of my invention is to provide an exceedingly simple and efficient means for picking hops which will enable the user to pick the hops from the vines regardless of their position with a minimum expenditure of time and effort.

A further object is to reduce the amount of leaves which are usually picked with the hops when ordinary methods are employed.

I accomplish these results in the manner set forth in the following specification and illustrated in the accompanying drawing, in which:

Figure 1 is a plan of the device of which Figure 2 is a front elevation and Figure 3 a right hand elevation. Figure 4 is a left hand elevation of my device showing the manner in which it is held in the hand and the way in which it operates.

Similar numbers of reference refer to the same parts throughout the several views.

Referring in detail to the drawing, I have constructed my device in the form of a tapering U-shaped frame 10 whose legs 11 and 12 are curved slightly to fit the hand 13.

Projecting from the edge of the leg 12 is a front comb 14 having long teeth 15. Projecting from the end of the leg 11 is a side comb 16 provided with teeth 17. An adjustable strap 18 is placed across the open end of the frame 10. A cluster of hops 19 and leaves 20 are shown on the branch 21.

The operation of my device is as follows: It is applied to the hand as shown in Figure 4 and secured by the strap 18. It is preferable to provide one of the devices for each hand. The combs 14 and 16 on both hands are used to comb the hops from the vines into the basket. It will be understood that where the device is used on both hands it is preferably made right and left.

It is evident that no matter in which position the hops will hang it will be a simple matter to reach them with one of the four combs and to draw same into the basket.

In practice, it is found that the leaves are able to pass through the comb teeth and are not pulled off, and therefore do not find their way into the hop basket in objectionable quantities, as is the case when hops are picked under ordinary conditions.

What I claim as new is:

1. A hop picker consisting of a U-shaped handle adapted to receive a hand between its members; a comb formed on one side of one member parallel thereto; and a second comb across one end of the opposite member, the teeth of said combs pointing in opposite directions.

2. A hop picker consisting of a U-shaped handle having curved side members with their convex sides innermost; a comb formed on one of said members in a plane passing through both members; and a second comb formed on the open end of the other member whose plane intersects the plane of the first comb at a small angle from the perpendicular; and a fastening means across the open end of said handle.

DANIEL E. WILLIAMSON.